Patented July 12, 1949

2,476,157

UNITED STATES PATENT OFFICE 2,476,157

SYNTHETIC LUBRICANTS BY THE CATALYTIC TREATMENT OF UNSATURATED KETONES

Ferdinand P. Otto, Woodbury, N. J., assignor to Socony-Vacuum Oil Company, Incorporated, a corporation of New York No Drawing. Application January 23, 1947, Serial No. 723,890

2 Claims. (Cl. 260—666)

This invention relates to new compositions of matter formed by the treatment of oleone and similar unsaturated ketones with a catalyst.

Oleone has been prepared from red oil by treatment with reduced iron powder or red iron oxide at around 650° F. under a positive pressure of 20 to 40 pounds per square inch, in accordance with United States patent application Serial No. 490,682, filed June 12, 1943, by Meyer and Otto, on Method of preparing high molecular weight aliphatic ketones, now United States Letters Patent No. 2,410,096. Similar unsaturated ketones having 10 to 30 carbon atoms in each alkene radical are known.

According to the present invention, it has been discovered that such compounds can be converted into new products that differ greatly in physical and chemical characteristics from the starting ketones, and that have properties that make them valuable as synthetic lubricating oils.

A number of catalysts are satisfactory for the conversion of unsaturated ketones to new products of the type with which this application is concerned. Among these are hydrogen fluoride, a pelleted synthetic silica-alumina cracking catalyst comprising about 88% $SiO_2$ and 12% $Al_2O_3$ on a dry basis, an activated montmorillonite clay marketed by the Filtrol Corporation, bead catalyst, which is a silica-alumina catalyst formed from a true hydrogel into spheres, and containing approximately 90% $SiO_2$ and 10% $Al_2O_3$.

By treating the unsaturated ketones mentioned above with any one of the three solid catalysts mentioned, at a temperature of about 500 to 650° F. for about 3 to 7 hours, the ketones are converted into products which compare favorably with the most highly-refined, oxidation-resistant, mineral lubricating oils. These products have extremely high viscosity indices.

Analysis indicates that the percentage of oxygen in the conversion products is considerably less than is present in the starting ketones, and it is reasonable to believe therefore that water is split from the molecule, or molecules, during the reaction.

The iodine number of the products indicates that at least one double bond in the unsaturated ketone molecule is utilized in the reaction and it is reasonable to theorize that the reaction involved is therefore dependent also upon the olefinic nature of the ketone. The necessity of using an unsaturated ketone is further substantiated by the fact that 16-hentriacontanone, a saturated aliphatic ketone, failed to yield a conversion product under similar conditions.

The molecular weights of the conversion products are on the average about the same as, or a little lower than, the starting ketone. This indicates that the reaction involved is probably not a polymerization. It also indicates that the products obtained are derived by a single reaction involving the double bond and carbonyl group in a single molecule of the unsaturated ketone. If an interaction occurred, involving more than one molecule of the ketone, the molecular weights of the products would be expected to be considerably higher than they have proved to be.

From these facts it can be reasoned that the conversion products are probably cyclic hydrocarbons formed by a reaction of the carbonyl group with a double bond, or bonds, contained in the unsaturated ketone. A more remote mechanism might involve cracking of the oleone molecule followed by polymerization or condensation of the fragments into products of the physical and chemical properties described.

EXAMPLE I

Preparation of Oleone

Oleone (di-heptadecenyl ketone) was prepared from commercial grade oleic acid, known as White Elaine red oil, in an autoclave equipped with a mechanically-driven stirrer and a pressure relief valve which was set to maintain a positive pressure of 20 to 40 pounds per square inch at all times. Into this autoclave was charged 1500 g. of the oleic acid and finely-divided reduced iron powder was then stirred into the acid. The autoclave was closed and the mixture stirred and heated. The temperature was maintained at 625° F. for about 3 hours. Reaction was substantially complete by this time, as shown by the fact that no further change in the pressure occurred, indicating that gases were no longer being evolved from the reaction. In order to insure completion, however, the temperature was maintained at 625° F. for an additional 2½ hours. After cooling to room temperature, the product was diluted with about 800 cc. of benzene and filtered through adsorbent clay. The diluent, benzol, was then removed from the filtrate by distillation and 1200 g. of a pale yellow, wax-like material were recovered. This material had a neutralization number of 0.95, an iodine number of 100, and an aniline point of 38.4° C.

This same general procedure was used in the preparation of all of the oleone used in the following examples.

EXAMPLE II

Oleone-Pelleted Silica-Alumina Catalyst Reaction Product

Oleone prepared as above was reacted in the presence of a pelleted synthetic silica-alumina cracking catalyst, comprising about 88% $SiO_2$ and 12% $Al_2O_3$ on a dry basis, by placing 2400 g. of oleone and 480 g. of the catalyst in a 1-gallon gas-fired stirring autoclave and heating to 625° F. for a period of 5 hours. The product was diluted with about 500 cc. of A. S. T. M. precipitation naphtha and filtered through adsorptive clay. The filtrate was then topped under vacuum at 300° F. in order to remove the naphtha diluent and any low-boiling components formed during the reaction. The result was a yellow-green, fluorescent oil of which 1850 g. were recovered. This corresponds to a yield of 77% on the basis of the oleone used.

*Chemical and physical properties of product*

| | |
|---|---|
| A. P. I. gravity | 29.8 |
| Kinematic visc. at 100° F | 86.1 |
| Kinematic visc. at 210° F | 11.6 |
| Viscosity index | 126 |
| A. S. T. M. pour point, °F | 0 |
| Aniline point, °C | 96.0 |
| Iodine number | 44 |
| Refractive index at 20° C | 1.4912 |

EXAMPLE III

The product of Example II was de-waxed by treating it with 4 volumes of a de-waxing solution consisting of 40% methyl ethyl ketone, 57% benzene, and 3% toluene. The de-waxing was accomplished in the conventional manner at −20° F. and the filtrate was topped under vacuum at 320° F. to remove the de-waxing solvent and any light ends still remaining in the composition. A small amount of a hard wax-like substance representing 2.53% of the oil charged, was removed from the composition by the de-waxing solvent. The yield of de-waxed material was 89.5% of the starting quantity.

*Physical and chemical properties of de-waxed product*

| | |
|---|---|
| A. P. I. gravity | 28.1 |
| Kinematic visc. at 100° F | 148.7 |
| Kinematic visc. at 210° F | 16.24 |
| Viscosity index | 117 |
| A. S. T. M. pour point, °F | +5 |
| Aniline point, °C | 126 |
| Iodine number | 46 |
| Refractive index at 20° C | 1.4965 |
| Molecular weight | 395 |

EXAMPLE IV

The composition of Example III was hydrogenated by placing 800 g. of it and 80 g. of a nickel oxide hydrogenation catalyst manufactured by the Universal Oil Products Company in a 2-liter shaker bomb pressurized with hydrogen to 1675 pounds per square inch and heating to 500° F. for 3 to 6 hours. During the last hour of operation the rate of pressure drop was negligible, thereby indicating that hydrogenation was complete. The product was diluted with about 500 cc. of benzol, filtered to remove the catalyst and topped under vacuum at 175° C. to remove the solvent.

*Physical and chemical properties of hydrogenated product*

| | |
|---|---|
| A. P. I. gravity | 29.4 |
| Kinematic visc. at 100° F | 144.6 |
| Kinematic visc. at 210° F | 15.85 |
| Viscosity index | 117 |
| A. S. T. M. pour point, °F | 0 |
| Aniline point, °C | 139 |
| Iodine number | 19 |
| Refractive index at 20° C | 1.4863 |
| Molecular weight | 456 |

EXAMPLE V

Oleone-HF Product

Oleone was reacted in the presence of hydrogen fluoride at 70° F. by stirring a mixture of 197 g. of oleone and 102 g. of hydrogen fluoride together at 70° F. for a period of 7 hours, in a 1-liter Monel lined autoclave. The hydrogen fluoride was then released into an alkali trap and the product poured into a dilute solution of potassium hydroxide. After dilution with about 300 cc. of benzol the mixture was water washed until neutral and topped under vacuum at 300° F. The yield was 178 g. of a slightly viscous oil.

*Physical and chemical properties of product*

| | |
|---|---|
| A. P. I. Gravity | 24.9 |
| Kinematic viscosity at 100° F | 61.76 |
| Kinematic viscosity at 210° F | 798 |
| Viscosity index | 121 |
| A. S. T. M. pour point, °F | +35 |
| Iodine number | 68 |
| Molecular weight | 743 |

Following the general procedures described in the preceding examples, a series of products have been prepared as may be seen from the following table.

TABLE I

[Reaction conditions and yield]

| Sample No. | Catalyst Type | Catalyst Per cent | Reaction Temp., °F. | Reaction Time, Hrs. | Reaction Press., #/in.² | Vessel | Yield, Per cent |
|---|---|---|---|---|---|---|---|
| 1 | None | | | None | | None | 100.0 |
| 2 | do | | | do | | do | 100.0 |
| 3 | Si-Al | 25 | 650 | 5.5 | About 200 | Bomb | 74.5 |
| 4 | do | 25 | 550 | 6.0 | do | do | 78.0 |
| 5 | do | 25 | 600 | 6.5 | do | do | 91.5 |
| 6 | (Product 5 dewaxed at −20° F., 4% solids removed) | | | | | | |
| 7 | Si-Al | 25 | 575 | 3.0 | Atmospheric | Flask | 79.0 |
| 8 | do | 25 | 650 | 5.0 | About 200 | Bomb | 87.0 |
| 9 | (Product 8 hydrogenated using nickel catalyst at 500° F.) | | | | | | |
| 10 | Si-Al | 20 | 600 | 5.0 | About 200 | Autoclave | 86.0 |
| 11 | (Product 10 dewaxed at −18° F., topped at 325° F., 4.3% material removed) | | | | | | |
| 12 | Si-Al | 20 | 625 | 5.0 | About 200 | Autoclave | 76.5 |
| 13 | (Product 12 dewaxed at −20° F., topped at 325° F., 11.4% material removed) | | | | | | |
| 14 | (Product 13 hydrogenated using nickel catalyst at 500° F.) | | | | | | |
| 15 | Si-Al | 20 | 625 | 5.0 | About 200 | Autoclave | 84.0 |
| 16 | (Product 15 dewaxed at −20° F.) | | | | | | |
| 17 | (Product 16 hydrogenated using nickel catalyst at 500° F.) | | | | | | |
| 18 | HF | 105 | 70 | 5.0 | About 16 | Autoclave | |
| 19 | HF | 52 | 70 | 7.0 | About 14 | do | |
| 20 | HF | 61 | 200 | 4.0 | About 70 | do | |
| 21 | HF | 95 | 300 | 4.0 | About 350 | Bomb | |
| 22 | HF | 67 | 450 | 2.0 | About 1500 | do | |
| 23 | Bead Fines | 25 | 650 | 4.5 | About 200 | do | 73.5 |
| 24 | do | 25 | 575 | 4.5 | About 200 | do | 69.5 |
| 25 | do | 25 | 700 | 2.5 | About 200 | do | 77.5 |
| 26 | Adsorbent clay | 26 | 575 | 3.5 | Atmospheric | Flask | 82.5 |
| 27 | do | 25 | 575 | 5.0 | About 200 | Bomb | 75.0 |

[Properties of reaction products]

| | Iodine No. | Gravity API | Sp. Gr. at 60° F. | Kin. Visc. at 210° F. | Kin. Visc. at 100° F. | Kin. Visc. Index |
|---|---|---|---|---|---|---|
| 1 | 92 | 30.5 | .8735 | 8.38 | 45.96 | 147 |
| 2 | 106 | 30.8 | .8718 | 7.71 | 37.3 | >140 |
| 3 | 24 | 28.6 | .8838 | 13.93 | 117.9 | 119 |
| 4 | 49 | 28.4 | .8849 | 22.26 | 218.6 | 120 |
| 5 | 30 | 28.1 | .8866 | 20.12 | 197.0 | 118 |
| 6 | | 27.7 | .8888 | 21.32 | 218.1 | 117 |
| 7 | 19 | 28.9 | .8882 | 17.67 | 116.9 | 119 |
| 8 | 24 | 28.5 | .8844 | 12.52 | 98.3 | 122 |
| 9 | 13 | 31.3 | .8692 | 13.47 | 110.3 | 121 |
| 10 | 50 | 28.7 | .8833 | 14.88 | 127.5 | 120 |
| 11 | 50 | 28.6 | .8838 | 18.11 | 167.1 | 119 |
| 12 | 44 | 28.9 | .8822 | 11.70 | 86.1 | 126 |
| 13 | 46 | 28.1 | .8866 | 16.24 | 148.7 | 117 |
| 14 | 19 | 29.4 | .8794 | 15.85 | 144.6 | 117 |
| 15 | | | | | | |
| 16 | 55 | 28.4 | .8849 | 18.59 | 169.0 | 121 |
| 17 | 10 | 30.7 | .8724 | 17.18 | 153.2 | 121 |
| 18 | 87 | 26.7 | .8944 | 44.96 | 531.0 | 121 |
| 19 | 68 | 24.9 | .9047 | 61.76 | 798.0 | 121 |
| 20 | 69 | 25.8 | .8906 | 294.30 | 4990.0 | |
| 21 | 52 | 23.3 | .9141 | 39.70 | 628.0 | 106 |
| 22 | 26 | 25.6 | .9007 | 20.75 | 223.0 | 112 |
| 23 | 32 | 28.2 | .8860 | 13.30 | 111.8 | 118 |
| 24 | 56 | 28.5 | .8844 | 17.44 | 153.3 | 122 |
| 25 | 39 | 28.5 | .8844 | 9.41 | 67.5 | 122 |
| 26 | 30 | 28.2 | .8860 | 15.83 | 133.9 | 122 |
| 27 | 20 | 28.4 | .8849 | 14.29 | 126.4 | 116 |

[Properties of reaction products]

| Sample No. | Pour Point, °F. | Aniline Pt., °C. | Ref. Index at 20° C. | Mol. Wt. | Per Cent C. | Per Cent H | Per Cent O by Difference |
|---|---|---|---|---|---|---|---|
| 1 | +80 | | | | | | |
| 2 | +90 | 43.6 | | 417 | 83.73 | 12.67 | 3.60 |
| 3 | 0 | 106.0 | 1.4986 | 453 | 86.41 | 12.16 | 1.43 |
| 4 | +30 | | | | | | |
| 5 | +10 | | | 463 | | | |
| 6 | +10 | 102.4 | | | | | |
| 7 | +25 | 106.0 | 1.4971 | 504 | | | |
| 8 | +25 | 104.2 | 1.4963 | 430 | 87.01 | 12.06 | 0.93 |
| 9 | +30 | 125.2 | 1.4812 | 446 | 85.75 | 13.63 | 0.62 |
| 10 | +15 | | | | | | |
| 11 | +15 | 101.2 | 1.4928 | 435 | | | |
| 12 | 0 | 96.0 | 1.4912 | | | | |
| 13 | +5 | 126.0 | 1.4965 | 395 | 86.61 | 12.81 | 0.58 |
| 14 | 0 | 139.0 | 1.4863 | 456 | | | |
| 15 | | | | | | | |
| 16 | +15 | 98.8 | | | | | |
| 17 | +10 | 127.5 | 1.4207 | | | | |
| 18 | +35 | | | | | | |
| 19 | +35 | | | 743 | | | |
| 20 | | | | | | | |
| 21 | +5 | | | 463 | | | |
| 22 | −10 | | | | | | |
| 23 | 0 | 99.6 | 1.4979 | 370 | | | |
| 24 | +40 | 112.2 | 1.4898 | 495 | 86.63 | 12.80 | 0.57 |
| 25 | −10 | 83.4 | 1.4943 | 362 | | | |
| 26 | +65 | 106.0 | | 467 | | | |
| 27 | +20 | 126.6 | 1.4971 | 395 | | | |

Several practical tests of the new materials have been made to determine their utility as synthetic lubricants.

EXAMPLE VI

A rotating cylinder test was conducted in a reaction chamber consisting of a 9½-inch section of standard 5-inch iron pipe. Each end was closed with a flat steel plate, one end being equipped with a thermometer well and a 1/16-inch inside diameter air vent. The cylinder was rotated about a horizontal axis at 20 R. P. M. so that the sample wetted the entire curved surface. The cylinder was enclosed in an insulated box, and electrically heated.

25 cc. of the test oil was placed in the clean, sand-blasted cylinder. The vessel was started rotating with the heater adjusted to maintain the temperature in the reaction chamber at 300° F. After 72 hours the cylinder was allowed to cool to room temperature. The test oil was then removed from the apparatus and tested for kinematic viscosity at 100° F., kinematic viscosity at 210° F., neutralization number, and A. S. T. M. naphtha insolubles. The surfaces of the cylinder were examined for abnormal sludge or lacquer deposits after the completion of the test.

The following table shows the results of this test on several samples.

TABLE II
[Rotating cylinder test]

| Sample No. | Physical Properties Before Test | | | Physical Properties After Test | | | |
|---|---|---|---|---|---|---|---|
| | K. V. at 100° F. | K. V. at 210° F. | V. I. | K. V. at 100° F. | K. V. at 210° F. | Per cent Naphtha Insolubles | N. N. |
| 3 | 117.9 | 13.93 | 119 | 167.3 | 14.18 | .07 | 1.2 |
| 6 | 218.1 | 21.32 | 117 | 896.0 | 54.40 | .09 | 3.5 |
| 4 | 218.6 | 22.26 | 120 | 772.5 | 52.23 | .07 | 4.0 |
| 8 | 98.3 | 12.52 | 122 | 335.0 | 27.71 | .01 | 3.2 |
| 23 | 111.8 | 13.30 | 118 | 439.5 | 32.07 | .04 | 3.7 |
| 9 | 110.3 | 13.47 | 121 | 317.8 | 26.51 | .07 | 4.5 |
| 24 | 153.3 | 17.44 | 122 | 498.0 | 37.72 | .04 | 3.3 |
| 10 | 127.5 | 14.88 | 120 | 1152.0 | 63.30 | | 4.2 |
| 11 | 167.1 | 18.1 | 119 | 702.0 | 46.33 | | 3.2 |
| 17 | 153.2 | 17.18 | 121 | 312.0 | 27.21 | .14 | 3.0 |

EXAMPLE VII

A bubble test was conducted to determine the relative tendency of various oil compositions to corrode metal bearings. According to this test a carefully weighed standard test piece of cadmium-silver alloy-surfaced bearing weighing about 6 g. was placed in a 200 x 25 mm. test tube together with 30 g. of the oil to be tested. A 5 mm. glass inlet tube drawn down to about 1 mm. inside diameter for about 30 mm. at one end was used to conduct air to the bottom of the test tube. The test tube was placed in a constant temperature bath and held at 175° C. while air was blown through the test oil at a rate of 2 liters per hour during the test. The loss in weight in milligrams of the bearing during the test was determined and also the changes in characteristics of the oil.

The results of a series of these tests are given in the following table.

TABLE III
[Modified bubble test]

| Sample No. | K. V. at 100° F. | K. V. at 210° F. | V. I. | Duration of Test, Hours | N. N. | K. V. at 210° F. | A. S. T. M. Sludge | Bearing Loss, Mgms. |
|---|---|---|---|---|---|---|---|---|
| 3 | 117.9 | 13.93 | 119 | 46 | 0.4 | 18.41 | Trace | 11 |
| 4 | 218.6 | 22.26 | 120 | 24 | 3.5 | 34.60 | Nil | 9 |
| 23 | 111.8 | 13.30 | 118 | 48 | 4.8 | 22.86 | .02 g | 22 |
| 24 | 153.3 | 17.44 | 122 | 48 | 5.7 | 33.66 | .05 g | 8 |
| 25 | 67.5 | 9.41 | 122 | 48 | 3.9 | 24.63 | .02 g | 10 |
| 18 | 531.0 | 44.96 | 121 | 48 | 0.8 | | Nil | 11 |

EXAMPLE VIII

A series of Lauson piston detergency tests were also conducted on the new materials. The purpose of this test is to measure the effectiveness of the test oil in preventing piston fouling as measured by the cleanliness of rings, lands, ring grooves, skirt and inside crown of the piston. In the test, a half-gallon of sample is used in a Lauson single-cylinder, four-cycle, liquid-cooled engine with jet lubrication. The fuel used is 100% straight-run gasoline plus 2½ cubic centimeters of tetraethyl lead, and under operating conditions the oil temperature is 225° F., the jacket temperature 350° F., speed 1830 R. P. M., the throttle setting ½, and the fuel-air ratio 13:1. The "rating" is based on engine cleanliness at the end of a run of 30 hours and is reported on a numerical scale of 0–100, 100 representing a perfectly clean piston. The following table gives the results of these tests.

TABLE IV

| Sample No. | Hours | N. N. | K. V. at 210° F. | | Percent Increase in Viscosity | Rating |
|---|---|---|---|---|---|---|
| | | | Before Test | After Test | | |
| 11 | 30 | 7.7 | 18.11 | 32.78 | 81.2 | 40 |
| 14 | 30 | 5.0 | 15.85 | 24.11 | 52.2 | 60 |

EXAMPLE IX

A series of laboratory stability-corrosion tests were also conducted. In these tests, a 160 cc. sample of the composition to be tested is placed in a 19 x 1¾" test tube. Ferric-2-ethylhexoate is blended with the oil in an amount of 0.012%, calculated as $Fe_2O_3$, and 0.1% of 200 mesh $PbBr_2$ is added at the start of the test. 70 liters of air per hour are blown through the oil at 280° F. by means of a bubbler device over which a hollow steel cylinder is placed so that it forms an air lift. The oil is thus pumped up through the cylinder. A polished section of a copper-lead bearing with an area of 5.7 cm.$^2$ is held at the inside top portion of the steel cylinder by 1½" of No. 22 copper wire. As the oil is pumped up through the cylinder, it flows past this copper-lead bearing and back down the outside of the cylinder to the bottom of the tube. In this way a constant circulation of oil is maintained. Changes in the characteristics of the oil, the loss in weight of the bearings, the sludge deposit in the tube and the lacquer deposit on the cylinder are noted. The following table gives the results of several of these tests.

The reaction product used in these tests was prepared by treating oleone with a pelleted silica-alumina catalyst at 650° F. for a period of 5 hours in an autoclave. The product obtained had the following properties.

| | |
|---|---|
| A. P. I. gravity | 26.5 |
| Kinematic viscosity at 100° F | 60.39 |
| Kinematic viscosity at 210° F | 8.37 |
| Viscosity index | 116 |
| Pour point | +5° F. |
| Aniline point | 91.4° C. |
| Refractive index at 20° C | 1.5107 |

The corrosion inhibitor used is obtained by reacting 100 parts of pinene and 90 parts of S. A. E. 10 motor oil with 40.8 parts of phosphorus pentasulfide at about 150° C.

TABLE V
[Laboratory stability-corrosion test]

| Composition | Hours | N. N. | K. V. at 210° F. | Per Cent Vis. Increase | Cu-Pb Bearing Strip Wt. Loss, gms. | Sludge in Tube | Lacquer on Cyl. |
|---|---|---|---|---|---|---|---|
| Reaction Product Only | 0 | 0.4 | 8.69 | | | | |
| | 16½ | 1.6 | 12.85 | 48 | | | |
| | 24 | 1.9 | 14.17 | 63.1 | | | |
| | 40½ | 3.5 | 16.82 | 93.5 | .0564 | Nil | Nil |
| Reaction Product plus ¼% of Corrosion Inhibitor | 0 | 0.5 | 8.72 | | | | |
| | 16½ | 0.7 | 11.0 | 26.4 | | | |
| | 24 | 0.7 | 11.54 | 32.4 | | | |
| | 40½ | 0.4 | 12.42 | 42.5 | .0004 | Nil | Nil |

EXAMPLE X

In order to test the effectiveness of pour depressants on the new compositions, various percentages of a commercial pour depressant were added to the product of Example IV and the effect on the pour point was noted. This pour depressant consisted essentially of tetrawax phenol phthalate.

| Composition: | A. S. T. M. pour point |
|---|---|
| Product of Example IV | +10° F. |
| Product of Example IV +0.25% pour depressant | −10° F. |
| Product of Example IV +0.125% pour depressant | −5° F. |

As shown by the foregoing examples and tables, a series of new compounds can be prepared in accordance with the principles of this invention. These new compounds have characteristics which make them valuable as synthetic lubricating oils. In the examples and table, oleone has been used as an example of an unsaturated ketone that may, by the process of this invention, be converted into products that are useful. Oleone is used, however, because it is readily available and furnishes a good example. Other similar unsaturated ketones containing either similar or mixed alkene radicals, each having from between ten and thirty carbon atoms, can also be used as the starting material.

What is claimed is:

1. The product formed by treating an unsaturated ketone having ten to thirty carbon atoms in each alkene radical with a catalyst selected from the group consisting of synthetic silica-alumina cracking catalyst and activated montmorillonite clay, at a temperature falling within the range varying between about 500° F. and about 650° F. and for a period of time varying between about three hours and about seven hours.

2. The product formed by treating oleone with a catalyst selected from the group consisting of synthetic silica-alumina cracking catalyst and montmorillonite clay, at a temperature falling within the range varying between about 500° F. and about 650° F. and for a period of time varying between about three hours and about seven hours.

FERDINAND P. OTTO.

REFERENCES CITED

The following references are of record in the file of this patent:

UNITED STATES PATENTS

| Number | Name | Date |
|---|---|---|
| 559,636 | Tiemann | May 5, 1896 |
| 1,831,105 | Fairley | Nov. 10, 1931 |
| 2,407,087 | Lieber | Sept. 3, 1946 |

OTHER REFERENCES

Karrer: Organic Chemistry, page 159 (1938), Nordemann Pub. Co., New York.

Taylor: Richter Organic Chem., vol. 2, pages 127–8 (1939), Nordemann Pub. Co., New York.